(12) United States Patent
Saito et al.

(10) Patent No.: US 6,609,829 B2
(45) Date of Patent: Aug. 26, 2003

(54) HYDRODYNAMIC BEARING FOR MOTOR

(75) Inventors: Shoichi Saito, Hachioji (JP); Hiromichi Sakano, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 34 days.

(21) Appl. No.: 10/027,375

(22) Filed: Dec. 20, 2001

(65) Prior Publication Data

US 2002/0097931 A1 Jul. 25, 2002

(30) Foreign Application Priority Data

Jan. 19, 2001 (JP) ........................................ 2001-012031

(51) Int. Cl.[7] ................................................ F16C 32/06
(52) U.S. Cl. ........................................ 384/108; 384/100
(58) Field of Search ................................ 384/100, 107, 384/108, 109

(56) References Cited

U.S. PATENT DOCUMENTS 4,332,428 A * 6/1982 Maruyama .................. 384/100
5,141,338 A * 8/1992 Asada et al. ................. 384/114
5,614,477 A * 3/1997 Kompan et al. ............. 508/113
5,707,718 A * 1/1998 Matsukawa et al. ........ 384/108
5,709,480 A * 1/1998 Hong .......................... 384/100
5,941,646 A * 8/1999 Mori et al. .................. 384/279
6,364,532 B1 * 4/2002 Yoshikawa et al. ......... 384/107
6,380,651 B1 * 4/2002 Yamaguchi et al. ........ 384/100

FOREIGN PATENT DOCUMENTS

JP 405171169 A * 7/1993
JP 7-109215 11/1995

* cited by examiner

Primary Examiner—Thomas R. Hannon
(74) Attorney, Agent, or Firm—Scully, Scott, Murphy & Presser

(57) ABSTRACT

A hydrodynamic bearing according to the present invention comprises a rotary shaft having a convex portion provided at one end portion thereof, a sleeve which rotatably supports the rotary shaft, and having herringbone grooves formed in an inner wall thereof at positions, a thrust bearing which is provided in contact with an end portion of the rotary shaft on the convex portion side and restricts movement of the thrust bearing or the rotary shaft in an axial direction thereof, and a lubricant sealed in a space surrounded by the rotary shaft, the sleeve and the thrust bearing.

2 Claims, 4 Drawing Sheets

HYDRODYNAMIC BEARING FOR MOTOR

CROSS-REFERENCE TO RELATED APPLICATIONS

This application is based upon and claims the benefit of priority from the prior Japanese Patent Application No. 2001-012031, filed Jan. 19, 2001, the entire contents of which are incorporated herein by reference.

BACKGROUND OF THE INVENTION

1. Field of the Invention

The present invention relates to a hydrodynamic bearing for a motor, which is intended to extend bearing life in a hydrodynamic bearing having a groove for generating a dynamic pressure provided thereto.

2. Description of the Related Art

In recent years, increase in density and speed and reduction in price have been demanded in disk drive apparatuses or polygon mirror drive apparatuses, and an increase in accuracy, prolongation of life under high-speed operation and reduction in cost are required in bearings for the drive motors of these apparatuses.

Prolongation of bearing life has been conventionally attempted, and Jpn. Pat. Appln. KOKAI Publication No. 7-109215 has proposed an example of such prolongation in, for example, a hydrodynamic bearing. In the hydrodynamic bearing disclosed in this publication, a dynamic pressure generation groove is formed on the inner peripheral surface of a sleeve supporting a circumferential surface of a rotary shaft, and the rotary shaft is rotatably provided at the center of the sleeve. An end surface of the rotary shaft is formed into a spherical plane having a curvature R equal to a radius of the rotary shaft and brought into contact with a thrust bearing attached to the lower part of the sleeve. Hardened stainless steel is used for the rotary shaft, and titanium carbide is used for the thrust bearing. Further, a fluorine group lubricant consisting of perfluoro polyester used for a lubricant is contained in the circumference of the rotary shaft as a lubricant for a bearing.

When the rotary shaft rotates, the lubricant produces a predetermined pressure by the pumping effect generated in the dynamic pressure generation groove on the inner wall of the sleeve, and the side surface of the rotary shaft and the inner wall of the sleeve rotate without being in contact with each other. Furthermore, the lower surface of the rotary shaft and the thrust bearing rotate in such a manner that the end portion of the rotary shaft is substantially in point contact with the thrust bearing. However, since titanium carbide whose hardness is high is used for the thrust bearing and the fluorine group lubricant intervenes, the abrasion resistance of the thrust bearing is increased where it is in point contact.

In this manner, the durability can be improved by a combination of reinforcement of materials of members having parts which are in point contact and the lubricant.

The above-described prior art, however, has the following drawbacks. That is, when the rotary shaft rotates, an oil film of the lubricant which is in contact with the spherical end surface is sucked toward the outside along the end surface by centrifugal force. Moreover, the oil film at the part which is in contact with the end of the rotary shaft becomes relatively thin. As a result, there occurs a problem that the abrasion phenomenon due to solid contact or frictional heat tends to be provoked.

In addition, the material cost of titanium carbide used for the thrust bearing supporting the end of the rotary shaft from the lower side is high and the workability is also inferior, which results in high cost. Additionally, although the hardness is Hv 4000 to 2500, which is higher than the hardness of general metal materials, the coefficient of friction with SUS or the like is high. Therefore, there is also a problem that abrasion at the end portion of the rotary shaft tends to occur.

In view of the above-described actual status, it is an object of the present invention to provide a hydrodynamic bearing for a motor, which includes a rotary shaft and a thrust bearing with good abrasion resistance and low price.

BRIEF SUMMARY OF THE INVENTION

To achieve this aim, the present invention takes the following measure in order to suppress generation of deficiency of an oil film by designing a lubricant itself or a flow of the lubricant, for example.

According to a first aspect of the present invention, there is provided a hydrodynamic bearing for a motor, comprising:

a rotary shaft having a convex portion provided at one end portion thereof;

a sleeve which rotatably supports the rotary shaft, and having herringbone grooves formed in an inner wall thereof;

a thrust bearing provided in contact with the end portion of the rotary shaft on the convex portion side, which restricts movement in an axial direction thereof; and a lubricant sealed in a space surrounded by the rotary shaft, the sleeve and the thrust bearing.

As a result of this aspect, when the rotary shaft rotates, the lubricant in the vicinity of the spherical plane of the convex portion rotates in a gap between the rotary shaft and the thrust bearing by its viscosity and the affinity to the rotary shaft, and the negative pressure in the vicinity of the center of the rotary shaft becomes small by decreasing movement of the lubricant sucked toward the outside by centrifugal force. Further, movement of the lubricant stops by achieving a balance between the centrifugal force and the negative pressure, thereby preventing deficiency of an oil film.

According to a second aspect of the present invention, there is provided a hydrodynamic bearing for a motor comprising:

a rotary shaft having a spherical plane provided at one end portion thereof;

a sleeve which rotatably supports the rotary shaft, and having herringbone grooves formed in an inner wall thereof;

a thrust bearing provided in contact with an end portion of the rotary shaft on the spherical plane side, which restricts movement of the rotary shaft in an axial direction thereof; and a lubricant sealed in a space surrounded by the rotary shaft, the sleeve and the thrust bearing, wherein a diamond-like hard carbon film is formed at at least one of a contact surface of the rotary shaft and a contact liquid level of the thrust bearing.

As a result of this aspect, the duration of life of the rotary shaft or the thrust bearing can be prolonged and the load can be reduced by utilizing a characteristic of the high surface hardness, small coefficient of friction and small affinity of the diamond-like hard carbon film.

According to a third aspect of the present invention, there is provided a hydrodynamic bearing for a motor comprising:

a rotary shaft having a spherical plane provided at one end portion thereof;

a sleeve which rotatably supports the rotary shaft, and having herringbone grooves formed in an inner wall thereof;

a thrust bearing provided in contact with an end portion of the rotary shaft on the spherical plane side, which restricts movement of the rotary shaft in an axial direction thereof; and a lubricant sealed in a space surrounded by the rotary shaft, the sleeve and the thrust bearing, ultra-fine diamond particles each having a particle size of 1 to 10 nm being added to the lubricant.

As a result, when the ultra-fine diamond particles each having a particle size of 1 to 10 nm intervene between the rotary shaft and the thrust bearing, the rotary shaft and the thrust bearing can be prevented from being directly brought into contact with each other.

The hydrodynamic bearing for a motor according to the present invention is designed as described above.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 3A and 3B show flows of oil particles in the vicinity of the end portion of a rotary shaft in the form of comparison between the first embodiment and prior art, in which FIG. 3A is an explanatory drawing showing the first embodiment in an enlarged manner and FIG. 3B is an explanatory drawing showing the prior art in an enlarged manner;

DETAILED DESCRIPTION OF THE INVENTION

A plurality of embodiments according to the present invention will now be described in detail hereinafter.

First Embodiment

As a concrete example, description will be given of a structure of a hydrodynamic bearing used for a spindle motor or the like and structures of respective constituent parts with reference to FIGS. 1 to 3B.

Figure 1:
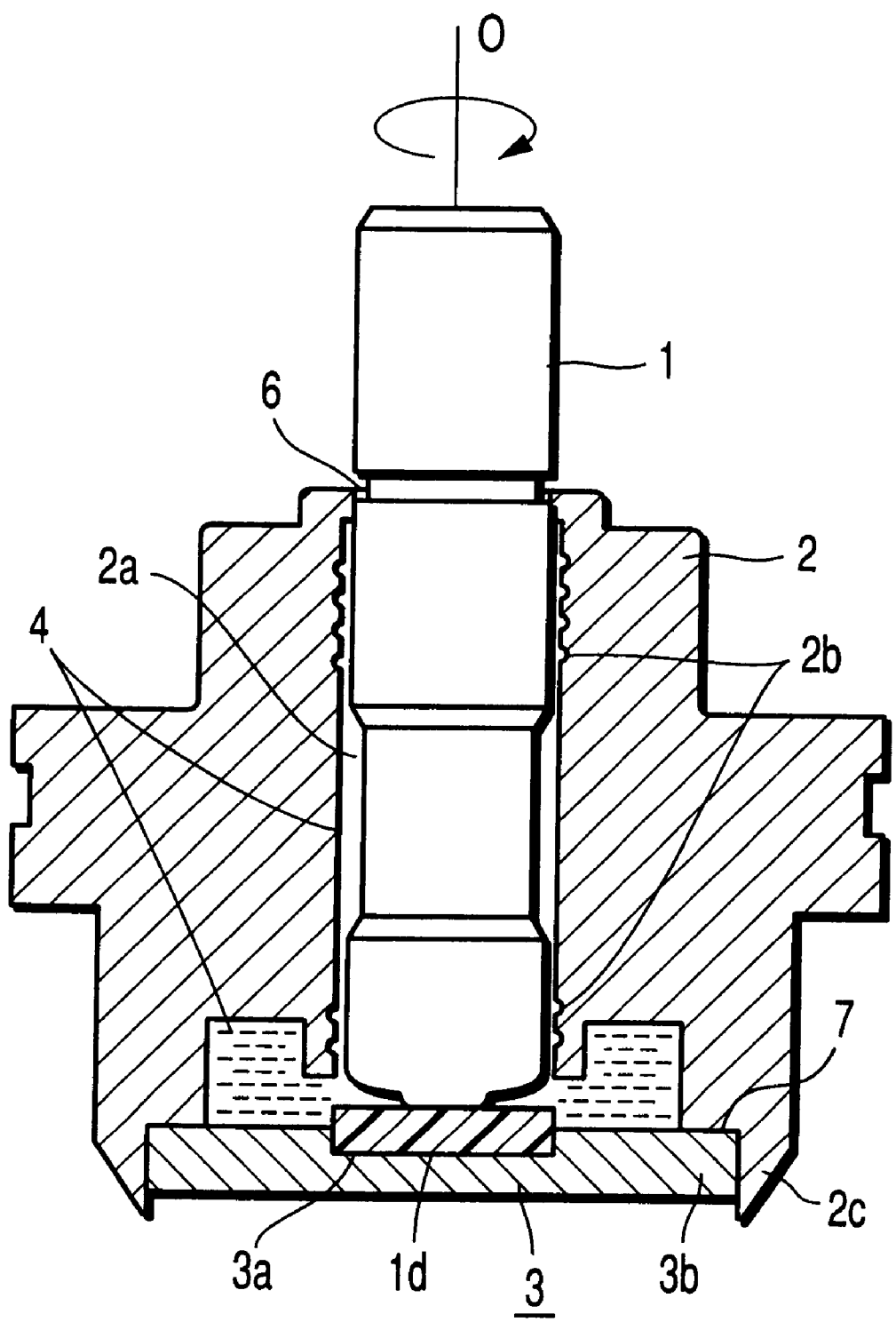
FIG. 1 is a cross-sectional view showing a structure of a hydrodynamic bearing for a motor according to a first embodiment of the present invention.
Figure 2:
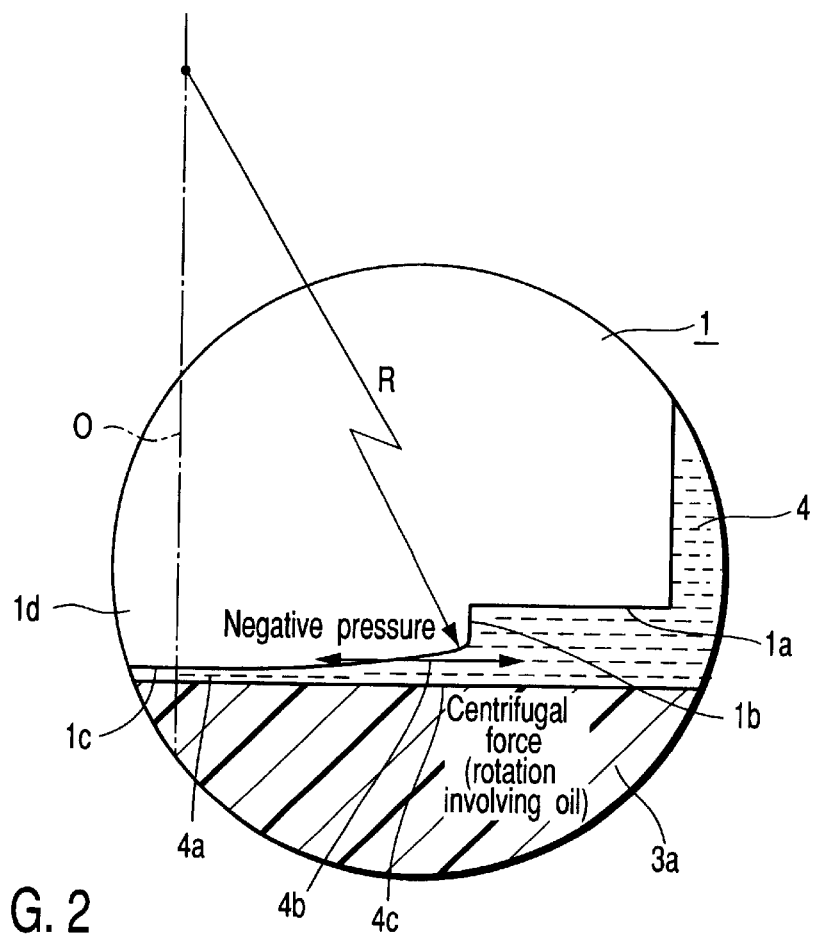
FIG. 2 is an enlarged cross-sectional view showing a flow of a lubricant at a shaft end portion of the hydrodynamic bearing for a motor illustrated in FIG. 1.

FIG. 1 shows a cross-sectional structure of an entire hydrodynamic bearing according to a first embodiment of the present invention, and FIG. 2 shows contact portions of a rotary shaft and a thrust bearing in an enlarged manner.

This hydrodynamic bearing has a rotary shaft 1 concerning a rotary member of a motor, and a sleeve 2 having a substantially cylindrical opening portion thereto so as to rotatably support the rotary shaft 1. Herringbone grooves 2b are formed to the sleeve 2 at appropriate positions on a sleeve inner wall 2a in the axial direction, and function as dynamic pressure generation grooves.

Further, a thrust bearing 3 for supporting the rotary shaft 1 from the lower part in the axial direction is provided so as to be capable of closing a bottom opening portion 7 formed in the vicinity of the bottom portion of the sleeve 2. A concave portion is formed to the thrust bearing 3 at a position corresponding to the shaft center O, and a thrust seat 3a is fitted in this concave portion. Then, an outer diameter portion 3b of the thrust bearing 3 is caulked and fixed at a lower end surface 2c of the sleeve 2. Furthermore, a predetermined lubricant 4 is introduced into a space sealed by the rotary shaft 1, the sleeve inner wall 2a and the thrust bearing 3, so that this lubricant 4 fills to the vicinity of an upper opening portion 6 of the sleeve 2.

A rotary shaft end at a position where the rotary shaft 1 and the thrust seat 3a come into contact with each other has a single-stage convex portion 1d which protrudes in a columnar form at the center of the lower part. Giving details in FIG. 2 in an enlarged manner, this unique shape of the convex portion 1d is constituted by a convex portion root plane 1a opposed to the thrust seat 3a, a convex portion outer diameter 1b smaller than the outer diameter of the rotary shaft 1 opposed to the sleeve inner wall 2a, and a spherical plane 1c having a curvature R sufficiently larger than the radius of the rotary shaft 1.

That is, in this embodiment, the diameter (outer diameter) of the columnar portion is set to a dimension sufficiently smaller than the radius of the rotary shaft. The spherical plane 1c, however, may be a composite spherical plane having two curvatures at a plurality of parts, for example.

Furthermore, hardened stainless steel which belongs to a hard martensitic group is adopted as a material used for the rotary shaft 1. On the other hand, as a material of the thrust seat 3a, there is adopted a material whose properties do not change by frictional heat due to support of rotational sliding of the rotary shaft 1 and which has high-temperature heat resistance, e.g., super engineering plastic such as polyimide amide is used as base material and a sliding material such as molybdenum disulfide is introduced. Incidentally, this can be manufactured by press working, or the thrust bearing 3 and the thrust seat 3a can be integrally molded by using the same material.

In the hydrodynamic bearing for a motor according to the first embodiment having the above-described structure, when the rotary shaft 1 rotates, a dynamic pressure is generated in the radial direction of the rotary shaft 1 by the herringbone grooves 2b and the lubricant 4, and the rotary shaft 1 and the sleeve inner wall 2a smoothly rotate without solid contact. In the axial direction of the rotary shaft 1, the convex portion 1d of the rotary shaft 1 is supported by the thrust seat 3a, and the rotary shaft rotates with an oil film 4a of the lubricant 4 being formed between the convex portion 1d and the thrust seat 3a. At this moment, when the rotary shaft 1 rotates, the lubricant 4b (oil particles) in the vicinity of the spherical plane 1c of the convex portion 1d (position away from the shaft center by a distance r) at a part which is in contact with the rotary shaft 1 (oil particles having a mass m) are involved in movement (brought around in a train) while rotating in a gap between the rotary shaft 1 and the thrust seat 3a by the viscosity of the lubricant 4 itself and the affinity to the rotary shaft 1 (see FIG. 3A, details will be described later). The lubricant 4b is sucked in the outer diameter direction of the convex portion 1d by the centrifugal force $mr^2$ which is generated by rotation of the lubricant 4b. Moreover, when the lubricant 4b is sucked, negative pressure is formed in the vicinity of the center of the rotary shaft 1, and movement of the lubricant 4b in the outer diameter direction substantially stops with the centrifugal force and the negative pressure being balanced.

In addition, as described above, since the convex portion outer diameter portion 1b is smaller than the diameter of the rotary shaft 1 opposed to the sleeve inner wall 2a, the force (centrifugal force=$mr^2$) acting on the lubricant 4b existing in a gap between the thrust seat 3a and the spherical plane 1c becomes small, and the negative pressure in the vicinity of the center of the rotary shaft 1 can be suppressed. As a result, since deficiency of the oil film (discontinuity of the film) hardly occurs, it is possible to maintain the state that the lubricant 4b is constantly filled. Therefore, abrasion between the convex portion 1d and the thrust seat 3a can be reduced, and duration of the bearing life can be improved.

Figure 3A:
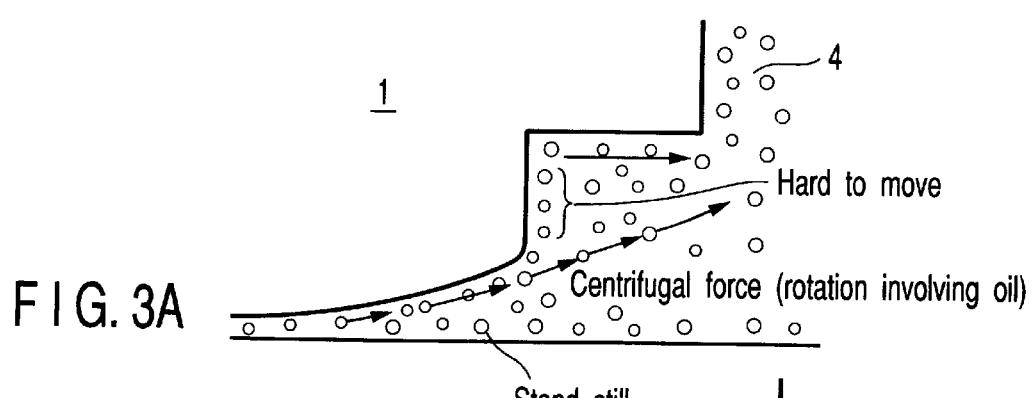
Figure 3B:
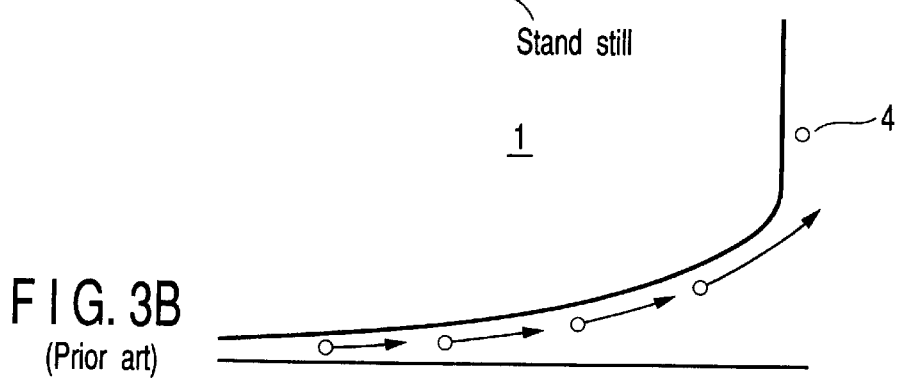

Here, showing a difference in flow of the lubricant 4 between the first embodiment and the prior art in FIGS. 3A and 3B, deficiency of the oil film which occurs as a result of the sequential flow without stopping of oil particles in the outer direction indicated by an arrow along the end surface of the rotary shaft, as shown in FIG. 3B, illustrating the prior art, can be prevented by the first embodiment as shown in FIG. 3A. That is, in this first embodiment, the lubricant 4b existing between the convex portion 1d and the thrust seat 3a is brought around in a train while rotating by the affinity to the convex portion 1d at a part in the vicinity of this portion. On the other hand, the viscosity load of the lubricant generated by stopping or delayed rotation of the lubricant 4c in the vicinity of the part adjacent to the thrust seat 3a is usually in inverse proportion to the oil film thickness and becomes large in proportion to the diameter of the contact part of the lubricant 4 and the rotary shaft 1. Here, since a gap between the thrust seat 3a and the convex portion root plane 1a is large in the axial direction and the oil film thickness is large, the viscosity load is small.

In addition, when the spherical plane 1c has a curvature R which is sufficiently larger than a radius of the rotary shaft 1, since a difference in gap between the thrust seat 3a and the convex portion 1d is small between the part in the vicinity of the center of the rotary shaft 1 and the part in the vicinity of the convex portion outer diameter 1b, the thickness of the oil film 4a becomes thin as a whole as compared with the prior art. However, when the convex portion outer diameter 1b is formed small, an area of a part where the oil film becomes thin is small, and hence the viscosity load can be reduced.

Additionally, since a difference between the part in the vicinity of the center of the rotary shaft 1 and the part in the vicinity of the convex portion outer diameter 1b is small, point contact is alleviated, and deficiency of the oil film due to a thrust pressure hardly occurs.

As in the first embodiment, by making the end portion of the rotary shaft at the lower part into a convex shape having the spherical plane at the central part, a flow of particles of the lubricant is generated so as not to generate deficiency of oil, and solid contact of the thrust seat 3a and the convex portion 1d of the rotary shaft 1 at the end thereof can be assuredly prevented. Therefore, sufficient abrasion resistance which can cope with high-speed rotation of a motor or the like can be demonstrated.

Second Embodiment

Figure 4:
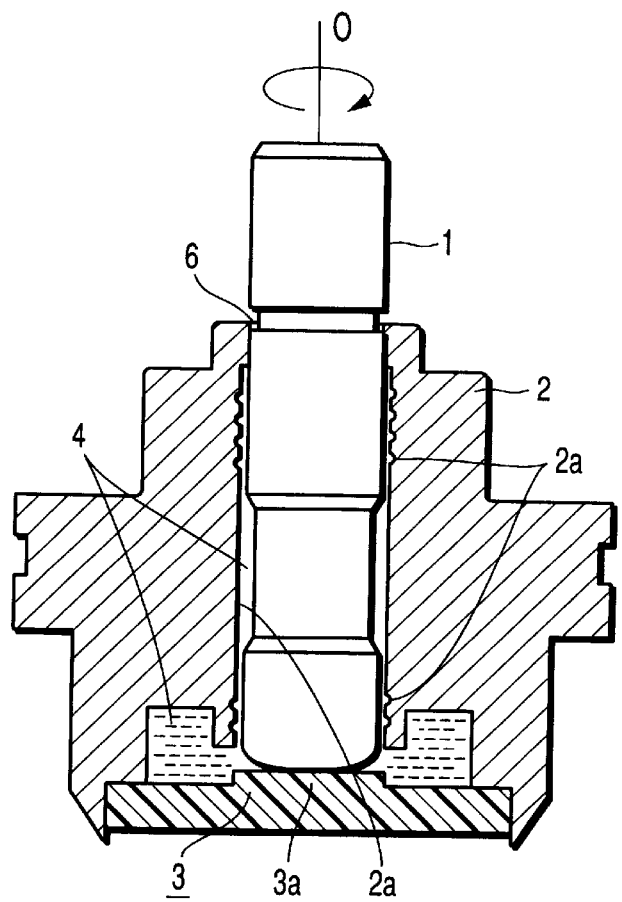
FIG. 4 is a cross-sectional view showing a structure of a hydrodynamic bearing for a motor according to a second embodiment of the present invention.
Figure 5:
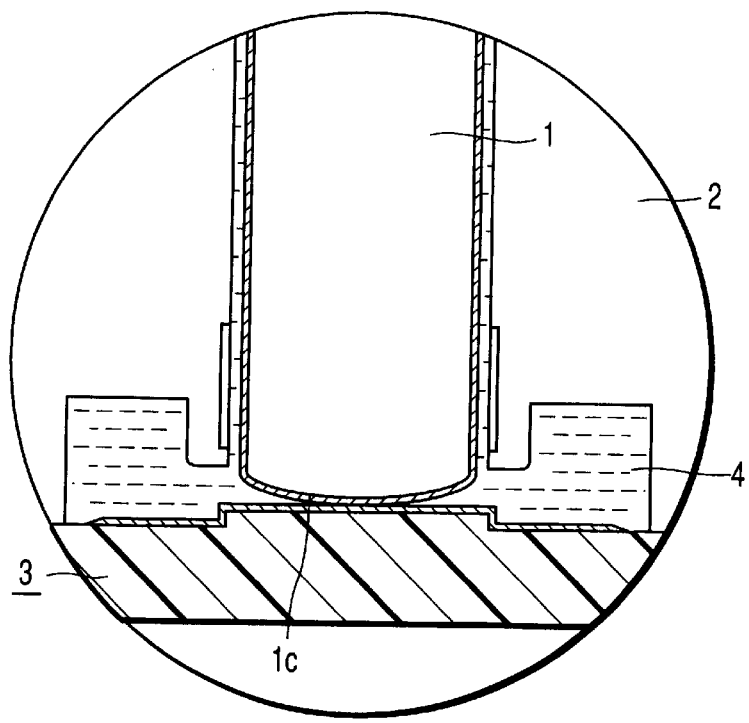
FIG. 5 is a partially enlarged cross-sectional view showing a rotary shaft and a thrust bearing of the hydrodynamic bearing for a motor according to the second embodiment.

A hydrodynamic bearing for a motor according to a second embodiment of the present invention will now be described with reference to FIGS. 4 and 5. FIG. 4 shows a cross-sectional structure of the entire bearing, and FIG. 5 shows an opposed part of the rotary shaft and the thrust bearing in this bearing in an enlarged manner.

In a similar way to the hydrodynamic bearing for a motor according to the first embodiment mentioned above, this bearing has a rotary shaft 1 and a sleeve 2 rotatably supporting the rotary shaft 1. Herringbone grooves 2 are formed on a sleeve inner wall 2a at appropriate positions in the axial direction, and a thrust bearing 3 for supporting the rotary shaft 1 in the axial direction is fixed to the lower part of the sleeve. Also, a lubricant 4 is introduced in a space sealed by the rotary shaft 1, the sleeve inner wall 2a and the thrust bearing 3. In the thrust bearing 3 of this example, however, the above-mentioned part of a thrust seat 3a is integrally molded in a convex shape by the same material and constituted by one member.

The main characteristic of the hydrodynamic bearing for a motor according to the second embodiment lies in that a sequential spherical plane 1c is provided to the rotary shaft 1 at a part where the rotary shaft 1 and the thrust bearing 3 come into contact with each other. Further, a film of diamond like carbon which is generally called "DLC" is formed on the opposed surface of both or either of the rotary shaft 1 and the thrust bearing 3.

The main technique for forming a film of DLC is either PVD (Physical Vapor Deposition), which is a physical method, or CVD (Chemical Vapour Deposition) which is a chemical method.

Furthermore, the rotary shaft 1 may not have a DLC film formed on a plane opposed to the sleeve inner wall surface 2a, and the thrust bearing 3 may have a DLC film only on a plane which is contact with the rotary shaft 1.

In the hydrodynamic bearing for a motor according to the second embodiment having the above-described structure, a dynamic pressure is likewise generated by the herringbone grooves 2b and the lubricant 4 in the radial direction of the rotary shaft 1 when the rotary shaft 1 rotates, and the rotary shaft 1 and the sleeve inner wall 2a rotate without solid contact. The spherical plane 1c at the end of the rotary shaft 1 is supported by the thrust bearing 3 in the axial direction, and the rotary shaft 1 rotates with an oil film of the lubricant being formed between the spherical plane 1c and the thrust bearing 3.

Point contact is attained between the rotary shaft 1 and the thrust bearing 3 in the vicinity of the center, and the negative pressure caused by that rotation becomes large. Deficiency of the oil film, therefore, tends to be generated due to the thrust pressure. In this case, however, since the diamond like hard carbon (DLC) film having characteristics of high surface hardness, small coefficient of friction and small affinity is formed on the surfaces of the rotary shaft 1 and thrust bearing 3 which come into contact with each other, it is possible to demonstrate the advantage of prolongation of life of the rotary shaft 1 or the thrust bearing 3 and reduction in the load.

Furthermore, the DLC film forming method may be, for example, either PVD, which is a physical method, or CVD, which is a chemical method. Moreover, the DLC film can be formed at a time by aligning the rotary shaft 1 and the thrust bearing 3 in large quantities, which results in lower cost than that when manufacturing the entire components using expensive materials.

As in the second embodiment, by making the DLC film having high surface hardness, a small coefficient of friction relative to iron and steel or the like, and a small affinity on the spherical plane 1c of the rotary shaft 1 at the end of the lower part or the surface of the thrust bearing 3, the abrasion resistance of the rotary shaft 1 or the thrust bearing 3 can be increased.

Third Embodiment

Figure 6:
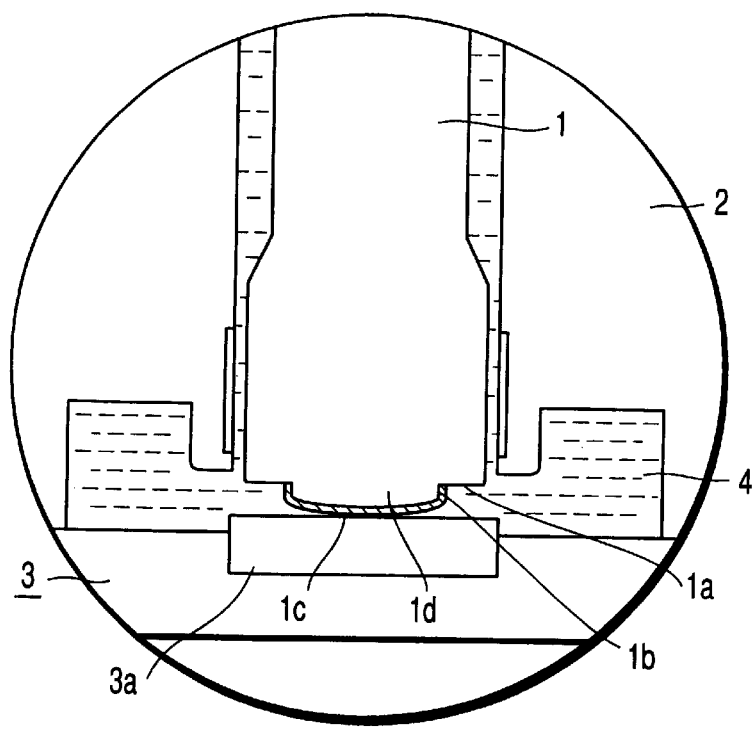
FIG. 6 is a partially enlarged cross-sectional view showing a rotary shaft and a thrust bearing of a hydrodynamic bearing for a motor according to a third embodiment of the present invention.

Description will now be given of a hydrodynamic bearing for a motor according to a third embodiment of the present invention with reference to FIG. 6. FIG. 6 shows a cross-sectional view of a rotary shaft 1 having a convex portion at the end portion of this bearing and a thrust bearing 3 having a thrust seat 3a separated therefrom in a partially enlarged manner.

In FIG. 6, the thrust seat 3a is fitted in a concave portion of the thrust bearing 3. At an end portion of the rotary shaft 1 which is brought into contact with the thrust bearing 3, a shape of a convex portion 1d is constituted by a convex portion root plane 1a opposed to the thrust bearing 3, a convex portion outer diameter 1b smaller than the outer diameter of the rotary shaft 1 opposed to a sleeve inner wall 2a and a spherical plane 1c having a curvature R sufficiently larger than a radius of the rotary shaft 1. In addition, the above-described DLC film is formed on at least the spherical plane 1c and the surface of the outer diameter 1b so that coating planes are obtained.

In the hydrodynamic bearing for a motor according to the third embodiment having the above-described structure, when the rotary shaft 1 rotates, a dynamic pressure is generated by herringbone grooves 3 and the lubricant 4 in the radial diameter of the rotary shaft 1, and the rotary shaft 1 and the sleeve inner wall 2a rotate without solid contact. At this moment, the spherical plane 1c at the end of the rotary shaft 1 is supported by the thrust bearing 3 in the axial direction. Furthermore, point contact is attained between the rotary shaft 1 and the thrust bearing in the vicinity of the center thereof, the rotary shaft 1 rotating with an oil film of the lubricant 2 being formed between the spherical plane 1c and the thrust bearing 3, and the negative pressure due to rotation becomes large. As a result, deficiency of the oil film tends to occur because of the thrust pressure. In this case, however, by forming on the surfaces of the rotary shaft 1 and the thrust bearing 3 which come into contact with each other DLC films having the characteristics that the surface hardness is as high as Hv 1200 to 5000, the coefficient of friction relative to iron and steel group material is as small as 0.1 to 0.15 and the affinity is small, duration of life of the rotary shaft 1 or the thrust bearing 3 can be prolonged, and the negative load can be reduced.

However, the affinity of the lubricant 4 relative to the rotary shaft 1 becomes small at the diameter of the rotary shaft 1 opposed to the sleeve inner wall 2a by the DLC film, and the dynamic pressure is lowered. Thus, this structure is not appropriate for a bearing in which sleeve length is short and herringbone grooves are not sufficiently provided.

Since the DLC film forming the coating plane has a hardness extremely higher than that of any other material, the DLC film should be formed at parts except for the thrust bearing outer diameter portion 3b when fixing the thrust bearing 3 and the sleeve 2 by caulking.

In the case of forming the DLC film or the rotary shaft 1, a plurality of holes may be provided to a jig, the outer diameter of the rotary shaft 1 is set in each hole of the jig so that the outer diameter is covered, and the convex portion 1d is exposed on the surface. Then, the obtained products are aligned in large quantities, thereby forming the DLC film at one time. Further, when the thrust bearing 3 is integrally molded, it can be manufactured by a method similar to that used for making the rotary shaft 1, which results in lower cost than that when manufacturing the entire components using expensive materials.

Furthermore, forming the film or the thrust seat 3a can be realized at a relatively low cost by forming the DLC film on a sheet-type material and then performing press working.

Fourth Embodiment

Description will now be given as to a hydrodynamic bearing for a motor according to a fourth embodiment of the present invention with reference to FIGS. 4 to 6 and FIG. 7. The bearing illustrated in FIGS. 4 to 7 has a rotary shaft 1 and a sleeve 2 for rotatably supporting the rotary shaft 1. Moreover, herringbone grooves 2b formed on a sleeve inner wall 2a at appropriate positions in the axial direction are provided, a thrust bearing 3 for supporting the rotary shaft 1 in the axial direction is fixed to the lower part of the sleeve, and a predetermined lubricant 4 is introduced in a space sealed by the rotary shaft 1, the sleeve inner wall 2a and the thrust bearing 3.

Figure 7:
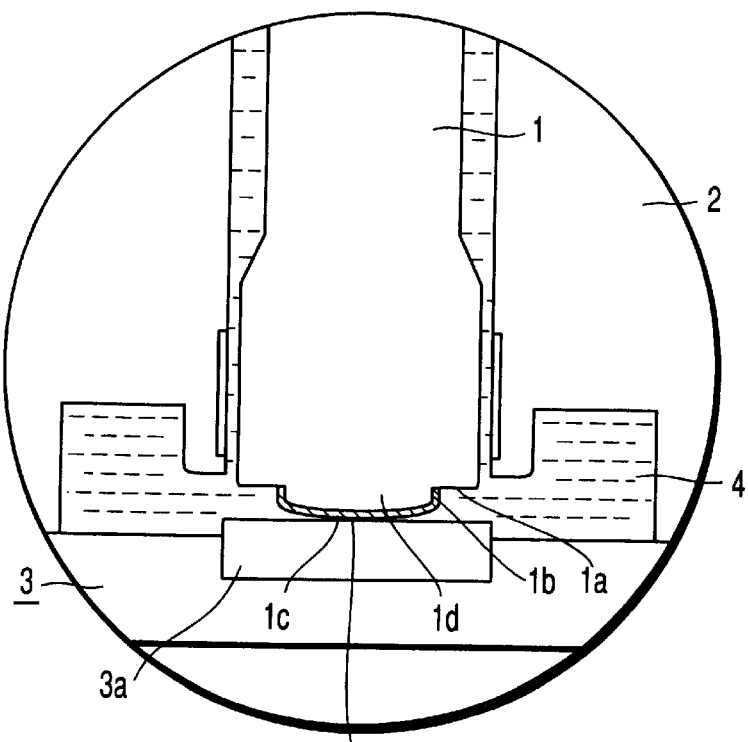
FIG. 7 is a partially enlarged cross-sectional view showing a rotary shaft and a thrust bearing of a hydrodynamic bearing for a motor according to a fourth embodiment of the present invention.

In a similar way to the foregoing embodiment, a spherical plane 1c is provided at the center of a convex portion 1d of the rotary shaft 1 with which the thrust bearing 3 comes into contact. Moreover, the main characteristic of the hydrodynamic bearing for a motor according to the fourth embodiment lies in that diamond particles 8 as ultra-fine particles each having a particle size of 1 to 20 nm are added to the lubricant 4 as shown in FIG. 7. In this manner, by adding the ultra-fine diamond particles in the lubricant so that they intervene between the rotary shaft 1 and the thrust bearing 3 in flux, the rotary shaft 1 and the thrust bearing 3 can be prevented from directly coming into contact with each other.

It is to be noted that a plurality of the herringbone grooves 2 each having a depth of 4 to 9 $\mu$m is formed and a gap between the rotary shaft 1, and the sleeve inner wall 2a is provided so as to be 1 to 4 $\mu$m on one side.

In the hydrodynamic bearing for a motor according to the fourth embodiment having the above-described structure, when the rotary shaft 1 rotates, a dynamic pressure is generated in the radial direction of the rotary shaft 1 by the herringbone grooves 2b and the lubricant 4, and each diamond particle is sufficiently smaller than the depth of the herringbone groove 2b or the gap between the rotary shaft 1 and the sleeve inner wall 2a. Therefore, the rotary shaft 1 and the sleeve inner wall 2a rotate without solid contact.

The rotary shaft 1 is supported in the axial direction by the thrust bearing 3 on the spherical plane 1c at the end of the rotary shaft 1, and the rotary shaft 1 rotates while an oil film including the diamond particles of the lubricant 4 is formed between the spherical plane 1c and the thrust bearing 3. Point contact is attained in the vicinity of the center of the rotary shaft 1 and the thrust bearing 3, and the negative pressure caused by rotation becomes large. Thus, even if deficiency of the oil film occurs because of the thrust pressure, the ultra-fine diamond particles added in the lubricant enter between the spherical plane 1c and the thrust bearing 3, and those ultra-fine particles act as the balls of a ball bearing. Therefore, the coefficient of friction becomes small without causing wearing of the spherical plane 1c and the thrust bearing 3. Accordingly, duration of life of the rotary shaft 1 or the thrust bearing 3 can be prolonged, and the load can be reduced.

Modification

It is to be noted that the above-described first to fourth embodiments may be modified as follows.

For example, as a material added in the lubricant or applied as a coating surface, an inexpensive powder substance which demonstrates an equivalent effect may be adopted besides the diamond particles. As a result, abrasion caused with the rotary shaft can be reduced, and duration of life of the bearing can be similarly improved.

In addition, although the hydrodynamic bearing for a motor given as examples as the present invention pursues abrasion resistance capable of coping with high-speed rotation, it can be applied to many other applications as a support device for a rotary shaft requiring high-speed rotation as well as a motor.

Besides, various modifications can be carried out without departing from the scope of the present invention.

Although the above has described the present invention based on the embodiments, this specification includes the following invention.

In this invention, there is provided a hydrodynamic bearing, in which a predetermined dynamic pressure generation groove is provided on the circumferential surface of the rotary shaft or the inner wall surface of the sleeve, the rotary shaft is supported by the thrust bearing in the radial direction at the spherical plane of the convex portion which is provided so as to protrude from the rotary shaft in the axial direction by generation of the dynamic pressure caused by the lubricant when the rotary shaft is driven, and the rotary shaft and the sleeve inner wall rotate without solid contact because of the oil film of the lubricant formed between the spherical plane of the convex portion and the thrust bearing, wherein the lubricant in the vicinity of the spherical plane of the convex portion has a characteristic that its part which is in contact with the rotary shaft demonstrates the viscosity of the lubricant itself and affinity to the rotary shaft, and that lubricant can move along the spherical plane of the convex portion in the outer diameter direction of the convex portion due to the centrifugal force applied to the oil particles which move while rotating in a gap between the rotary shaft and the thrust bearing, but movement of the lubricant is substantially stopped in the state that the negative pressure in the vicinity of the axial center which is caused by this movement and the centrifugal force is balanced.

There is provided a hydrodynamic bearing, wherein the convex portion is set to have a diameter smaller than the diameter of the rotary shaft opposed to the sleeve inner wall in such a manner that the centrifugal force acting on the lubricant existing in the gap between the thrust bearing and the spherical plane of the convex portion is small and the negative pressure in the vicinity of the center of the rotary shaft can be suppressed.

There is provided a hydrodynamic bearing, wherein the lubricant is composed by evenly mixing therein ultra-fine particles of diamond or particles having a hardness similar to that of diamond.

There is provided a hydrodynamic bearing, wherein the rotary shaft is martensitic hardened stainless steel, and a sliding material of molybdenum disulfide having super engineering plastic as a base material is introduced at a part opposed to the end of the rotary shaft.

According to the present invention, it is possible to provide a hydrodynamic bearing for a motor, which includes the rotary shaft and the thrust bearing having excellent abrasion resistance at a low price.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A hydrodynamic bearing for a motor comprising:

a rotary shaft having a convex portion provided at one end portion thereof;

a sleeve which rotatably supports said rotary shaft, and having herringbone grooves formed at positions in an inner wall thereof;

a thrust bearing which is provided in contact with a side end portion of said rotary shaft on said convex portion side and restricts movement of said rotary shaft in an axial direction thereof; and a lubricant sealed in a space surrounded by said rotary shaft, said sleeve and said thrust bearing;

wherein said convex portion has a columnar shape having a diameter smaller than the radius of said rotary shaft.

2. A hydrodynamic bearing for a motor according to claim 1, wherein a surface of said convex portion which comes into contact with said thrust bearing is a spherical plan, and the curvature radius of said spherical plane is larger than the radius of said rotary shaft.

* * * * *